US008761527B2

(12) United States Patent
Domanski et al.

(10) Patent No.: US 8,761,527 B2
(45) Date of Patent: Jun. 24, 2014

(54) IMAGE CODING METHOD

(71) Applicant: Poznan University of Technology, Poznan (PL)

(72) Inventors: Marek Domanski, Poznan (PL); Krzysztof Klimaszewski, Murowana Goslina (PL); Jacek Konieczny, Poznan (PL); Maciej Kurc, Poznan (PL); Robert Ratajczak, Lwowek (PL); Jakub Siast, Skwierzyna (PL); Olgierd Stankiewicz, Poznan (PL); Jakub Stankowski, Poznan (PL); Krzysztof Wegner, Murowana Goslina (PL)

(73) Assignee: Politechnika Poznanska, Poznan (PL)

( * ) Notice: Subject to any disclaimer, the term of this patent is extended or adjusted under 35 U.S.C. 154(b) by 50 days.

(21) Appl. No.: 13/680,652

(22) Filed: Nov. 19, 2012

(65) Prior Publication Data

US 2013/0129235 A1    May 23, 2013

(30) Foreign Application Priority Data

Nov. 17, 2011    (PL) .......................................... 397008

(51) Int. Cl.
    *G06K 9/36*    (2006.01)
(52) U.S. Cl.
    USPC .......................................................... 382/232
(58) Field of Classification Search
    None
    See application file for complete search history.

(56) References Cited

U.S. PATENT DOCUMENTS

| | | | | |
|---|---|---|---|---|
| 2002/0106103 | A1* | 8/2002 | Jones et al. | 382/100 |
| 2002/0164048 | A1* | 11/2002 | Bruckstein et al. | 382/100 |
| 2003/0123698 | A1* | 7/2003 | Murakami | 382/100 |
| 2005/0165611 | A1* | 7/2005 | Mehrotra et al. | 704/500 |
| 2007/0238415 | A1* | 10/2007 | Sinha et al. | 455/66.1 |
| 2009/0254783 | A1* | 10/2009 | Hirschfeld et al. | 714/701 |
| 2010/0309983 | A1* | 12/2010 | Jax | 375/240.18 |
| 2011/0015933 | A1* | 1/2011 | Maeda et al. | 704/500 |
| 2012/0046955 | A1* | 2/2012 | Rajendran et al. | 704/500 |

OTHER PUBLICATIONS

Kuo, Shyh-Shiaw, and James D. Johnston. "Spatial noise shaping based on human visual sensitivity and its application to image coding." Image Processing, IEEE Transactions on 11.5 (2002): 509-517.*
Jayant, Nikil, James Johnston, and Robert Safranek. "Signal compression based on models of human perception." Proceedings of the IEEE 81.10 (1993): 1385-1422.*
Woods, John W., and Sean D. O'neil. "Subband coding of images." Acoustics, Speech and Signal Processing, IEEE Transactions on 34.5 (1986): 1278-1288.*
Peter Symes, "Digital Video Compression", Oct. 2, 2003, McGraw-Hill/TAB Electronics, New York, New York. ISBN-10: 0071424873, ISBN-13: 978-0071424875.

(Continued)

*Primary Examiner* — Li Liu
(74) *Attorney, Agent, or Firm* — Mark M. Friedman

(57) ABSTRACT

An image coding method. The method includes encoding a first image, the first image having a reduced spatial resolution relative to an input image, wherein values of the first image depend on energy of corresponding areas of the input image, and encoding a first shape information of the shape of a spatial spectrum of the input image. The method further includes reconstructing a second image from the encoded first image, reconstructing a second shape information from the encoded first shape information, and generating a noise image having an intensity described by the second image and having a spectrum shape described by the second shape information.

12 Claims, 1 Drawing Sheet

(56) References Cited

OTHER PUBLICATIONS

ISO/IEC 14496-10:2010. Information technology—Coding of audio-visual objects—Part 10: Advanced Video Coding. (It is the same standard as ITU-T H.264).

ISO/IEC IS 10918-1, ITU-T recommendation T.81 (In T.81 you can find that "The identical text is also published as ISO/IEC International Standard 10918-1"), 1992.

R. Viswanathan, J. Makhoul, "Quantization Properties of Transmission Parameters in Linear Predictive Systems," IEEE Trans. Acoust., Speech, and Audio Processing,1975, vol. 23, pp. 309-321.

J. Dai, O.C. Au, Ch. Pang. W. Yang, F. Zou, "Film grain noise removal and synthesis in video coding", IEEE International Conference on Acoustics Speech and Signal Processing (ICASSP) 2010, pp. 890-893.

M. O. Zaw, K. H. Goh, J. Y. Tham, W. S. Lee, "A low complexity texture-discriminating noise removal method for video encoding", 5th IEEE Conference on Industrial Electronics and Applications (ICIEA), pp. 1701-1705, 2010.

V. Zlokolica, W. Philips, D. Van De Ville, "Robust non-linear filtering for video processing", 14th International Conference on Digital Signal Processing (DSP) 2002. vol. 2, pp. 571-574, 2002.

R. Gonzales, R. Woods, "Digital Image Processing", Addison Wesley, pp. 187-213, 1992.

A. Jain "Fundamentals of Digital Image Processing", Prentice Hall, pp. 244-253, 273-275, 1989.

* cited by examiner

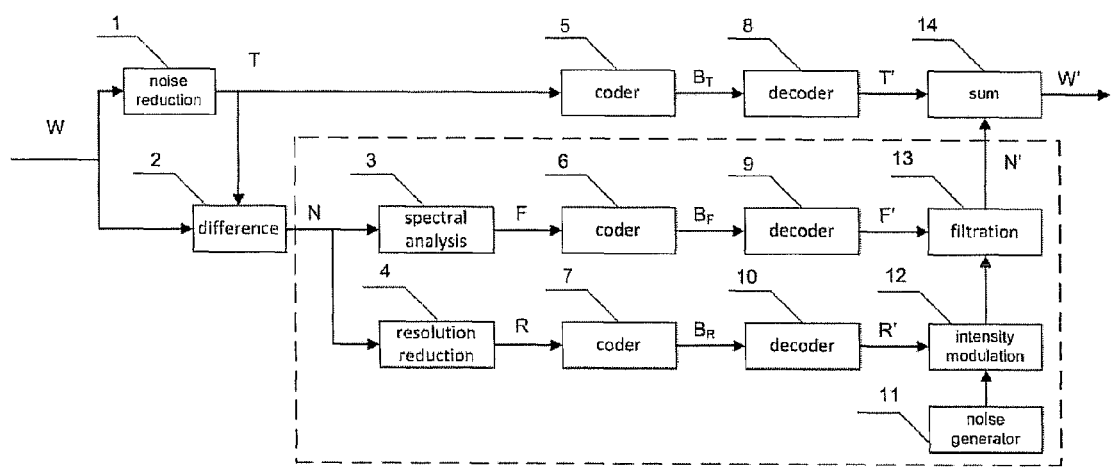

IMAGE CODING METHOD

CROSS-REFERENCE TO RELATED APPLICATIONS

This application claims priority to Polish Application No. P.397008, filed Nov. 17, 2011, the entire contents of which are hereby incorporated by reference.

BACKGROUND

An object of the invention is a method for image coding, applicable for compression of images and video sequences with noise character.

Contemporary techniques for lossy image and video sequences compression are known in the literature. See, e.g., Domanski "Obraz cyfrowy" Wydawnictwo Kominikacji i Lacznosci, edition 1, Warszawa 2010, from A. Bovik (editor); "Handbook of Image and Video Processing", Academic Press Series in Communications, Networking, and Multimedia, San Diego, Calif.: Academic Press, A Harcourt Science and Technology Company, ISBN: 0-12-119790-5; and P. Symes "Digital Video Compression" ISBN-10: 0071424873, ISBN-13: 978-0071424875, 2003. Such techniques are also disclosed in the description of the H.264/AVC standard. See, e.g., "ISO/IEC 14496-10:2010. Information technology—Coding of audio-visual objects—Part 10: Advanced Video Coding".

Spectrum information compression methods are also known in the literature: by using a DCT (discrete cosine transform), as in the JPEG standard, described in ISO/IEC IS 10918-1, ITU-T recommendation T.81; and by using filter parameters of finite and infinite impulse response, parametric coding with polynomial representation, and RC or LAR (log-area ratio) parameters as described in R. Viswanathan J. Makhoul, "Quantization Properties of Transmission Parameters in Linear Predictive Systems," IEEE Trans. Acoust., Speech, and Audio Processing, vol. 23, pp. 309-321, 1975.

Noise reduction in video sequences is a highly developed field. The overview of noise reduction methods can be found in the literature. See, e.g., A. Bovik (editor) "Handbook of Image and Video Processing", Academic Press Series in Communications, Networking and Multimedia, San Diego, Calif.: Academic Press, A Harcourt Science and Technology Company, ISBN: 0-12-119790-5.

Contemporary techniques for reduction of noise in video sequences are also known in the literature. See, e.g., J. Dai, O. C. Au, Ch. Pang. W. Yang, F. Zou, "Film grain noise removal and synthesis in video coding", IEEE International Conference on Acoustics Speech and Signal Processing (ICASSP) 2010, pp. 890-893, 2010; M. O. Zaw, K. H. Goh, J. Y. Tham, W. S. Lee, "A low complexity texture-discriminating noise removal method for video encoding", 5th IEEE Conference on Industrial Electronics and Applications (ICIEA), pp. 1701-1705, 2010; and V. Zlokolica, W. Philips, D. Van De Ville, "Robust non-linear filtering for video processing", 14th International Conference on Digital Signal Processing (DSP) 2002. vol 2, pp. 571-574, 2002. The purpose of these techniques is to provide the recipient (the viewer) with a possibly high quality noise-free content. The target quality is determined objectively (in relation to its theoretical noise model), or subjectively (customer experience).

Synthetic noise images generation techniques are also known in the literature. See, e.g., R. Gonzales, R. Woods, "Digital Image Processing", Addison Wesley, pp. 187-213, 1992; A. Jain "Fundamentals of Digital Image Processing", Prentice Hall, pp. 244-253, 273-275, 1989; E. Davies "Machine Vision: Theory, Algorithms and Practicalities", Academic Press, pp. 29-30, 40-47, 493, 1990; and B. Horn "Robot Vision|, MIT Press, vol. 2, 1986, and from A. Marion "An Introduction to Image Processing, Chapman and Hall", chapter 5, 1991.

The image compression techniques presented by the literature do not exploit the method according to the present invention.

SUMMARY

The essence of the invention is a method for image coding, which includes: encoding of an image R, the image R having reduced spatial resolution relative to an input image N, wherein the values of the image R depend on the energy of corresponding areas of input image N, and encoding information of the shape of a spatial spectrum F of the input image N; then, during a decoding process, a reconstruction R' of the encoded image R is decoded, a reconstruction of information F' about the shape of the spatial spectrum F is decoded, and a noise image is generated having an intensity described by the reconstruction of the encoded image R' and with a spectrum shape described by the shape of the reconstructed spatial spectrum F', to obtain a reconstructed image N' of the input image N.

The application of the method, according to the invention, has yielded the following technical and economical effects: efficient coding of video sequences with noise character; efficient coding of video sequences with a separated noise layer; and enhancement of the subjective quality of video sequences compressed with a separated noise layer.

BRIEF DESCRIPTION OF THE FIGURES

FIG. 1 shows a compression scheme wherein a video sequence is split into a denoised content layer and a noise character layer, according to an exemplary embodiment of the invention.

DETAILED DESCRIPTION

The invention can be illustrated by the following exemplary embodiment, and with reference to FIG. 1.

A natural image W may undergo noise reduction 1, which may result in a natural denoised image T. Subsequently, a noise layer image N may be calculated, the noise layer image N being the difference 2 between the natural image W and the natural denoised image T.

The noise layer image N can undergo spectral analysis 3, resulting in filter coefficients F having spectral characteristics corresponding to the spectral characteristics of the noise image N. In parallel, the noise layer image N can undergo spatial resolution reduction 4, by determining the signal energy in blocks of size 16×16, resulting in a noise layer image R having reduced spatial resolution.

Images T and R may be coded according to the H.264/AVC standard in coders 5 and 7, which can result in first and second compressed streams $B_T$ and $B_R$, respectively. Filter coefficients F can be encoded by quantization of their representation in the LAR space in coder 6, resulting in a third compressed stream $B_F$.

Next, after being sent through a transmission medium, the compressed streams $B_T$, $B_R$, and $B_F$, can be decoded to obtain reconstructed data. The reconstructed data includes a reconstructed denoised natural image T' in decoder 8, a reconstructed noise layer image R' having reduced spatial resolution in decoder 10, and filter coefficients F' in decoder 9.

Then, a synthetic white noise image can be generated 11 with a constant amplitude, which can subsequently undergo modulation 12 using the reconstructed reduced spatial resolution noise layer image R'. The result of modulation 12 can then undergo filtering 13 using a filter with coefficients F', resulting in a reconstructed noise layer image N'. Then, the reconstructed noise layer image N' can undergo addition 14 to the reconstructed denoised natural image T' resulting in a reconstructed natural image W'.

The foregoing exemplary detailed description of the successive steps of image coding according to the invention should not be interpreted as limiting the idea of the invention. One skilled in the art of compression, coding, and computer graphics can recognize that the described exemplary technique can be modified, adapted or implemented differently, without departing from its technical character and without diminishing the performance of the attained technical effects.

What is claimed is:

1. An image coding method, comprising:
    encoding a first image, the first image having a reduced spatial resolution relative to an input image, wherein values of the first image depend on energy of corresponding areas of the input image;
    encoding a first shape information of the shape of a spatial spectrum of the input image;
    reconstructing a second image from the encoded first image;
    reconstructing a second shape information from the encoded first shape information; and
    generating a noise image having an intensity described by the second image and having a spectrum shape described by the second shape information.

2. The method of claim 1, wherein the input image is the difference between a natural image and a denoised version of the natural image.

3. The method of claim 1, further comprising:
    reconstructing a natural image from the noise image and a denoised version of the natural image.

4. The method of claim 1, further comprising transmitting the encoded first image and the encoded first shape information through a transmission medium.

5. An image encoding method, comprising:
    encoding a first image, the first image having a reduced spatial resolution relative to an input image, wherein values of the first image depend on energy of corresponding areas of the input image; and
    encoding a shape information of the shape of a spatial spectrum of the input image.

6. The method of claim 5, wherein the input image is the difference between a natural image and a denoised version of the natural image.

7. The method of claim 5, further comprising transmitting the encoded image and the encoded shape information through a transmission medium.

8. An image decoding method, comprising:
    reconstructing an image from an encoded image;
    reconstructing a shape information from an encoded shape information; and
    generating a noise image having an intensity described by the image and having a spectrum shape described by the shape information.

9. The method of claim 8, further comprising:
    reconstructing a natural image from the noise image and a denoised version of the natural image.

10. The method of claim 8, further comprising receiving the encoded image and the encoded shape information through a transmission medium.

11. The method of claim 8, wherein:
    the encoded image has a reduced spatial resolution relative to an input image;
    values of the encoded image depend on energy of corresponding areas of the input image; and
    the encoded shape information includes the shape of a spatial spectrum of the input image.

12. The method of claim 11, wherein the input image is the difference between a natural image and a denoised version of the natural image.

* * * * *